(12) United States Patent
Amir et al.

(10) Patent No.: US 8,675,296 B2
(45) Date of Patent: Mar. 18, 2014

(54) CREATING AN IDENTICAL COPY OF A TAPE CARTRIDGE

(75) Inventors: Arnon Amir, Saratoga, CA (US); Rainer Richter, San Jose, CA (US); Harald Seipp, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 13/447,547

(22) Filed: Apr. 16, 2012

(65) Prior Publication Data

US 2013/0271865 A1 Oct. 17, 2013

(51) Int. Cl.
*G11B 5/86* (2006.01)

(52) U.S. Cl.
USPC .............. 360/15; 360/39; 360/48; 360/55

(58) Field of Classification Search
None
See application file for complete search history.

(56) References Cited

U.S. PATENT DOCUMENTS

| 7,685,186 B2* | 3/2010 | Jansen et al. ............. 707/661 |
| 7,747,584 B1* | 6/2010 | Jernigan, IV ............. 707/692 |
| 2006/0039672 A1* | 2/2006 | Yamada et al. ............. 386/46 |

* cited by examiner

*Primary Examiner* — Muhammad N Edun
(74) *Attorney, Agent, or Firm* — Mohammed Kashef

(57) ABSTRACT

Embodiments of the invention relate to creating an identical copy of a data storage tape cartridge. In one aspect, data contents of a source tape cartridge are copied to a destination tape cartridge. The source tape being formatted by a file system and includes at least one file system metadata block. Data blocks are read from the source tape to a memory buffer. Whether the blocks read are file system metadata blocks and whether the metadata blocks include cartridge-specific and/or cartridge-dependent content is determined. The content is adapted to the destination cartridge, thereby creating consistent file system metadata on the destination tape. The buffered blocks are written to the destination tape, thereby creating a file system on the destination tape that is a physical copy of the file system and data contents on the source tape.

26 Claims, 10 Drawing Sheets

CREATING AN IDENTICAL COPY OF A TAPE CARTRIDGE

BACKGROUND

Embodiments of the invention relate to the field of data storage, and in particular, to creating an identical copy of a data storage tape cartridge.

Traditional tape systems typically store data on tape using a backup application, which store the information required to retrieve the data on tape into an external database. The tape format is usually proprietary or tied to a specific vendor application.

Disk systems store data on hard disks using a file system, with standardized interfaces that allow application-independent access to the data. Likewise, storage-class memory (SCM) uses a file system on non-volatile memory (NVM) storage and provides similar functionality using a file system on the storage media. A file system on tape is a convenient general-purpose interface to store, maintain, and access files stored on tape. File system access to tape may provide, like with other file systems, a POSIX (Portable Operating System Interface) interface(s) with an operating system to enable applications to directly access, create, write and read files from tape.

Tape technology differs from disk and SCM technology in that tape is a medium that can only be accessed sequentially, even if a tape file system provides similar access mechanisms to data as for disk. New data can only be appended and previously written areas can only be re-claimed by overwriting the entire cartridge due to the mechanism used by systems to physically write the data. Tape technology also differentiates by providing standardized drive-level encryption and built-in data compression.

BRIEF SUMMARY

An aspect of the invention includes copying data contents of a source data storage tape cartridge to a destination data storage tape cartridge. The tape of the source cartridge being formatted by a file system and including at least one metadata block containing data associated with the file system. Data blocks are read from the tape of the source cartridge to a memory buffer, thereby buffering the data blocks. Whether the data blocks read are file system metadata blocks and whether the file system metadata blocks include cartridge-specific and/or cartridge-dependent content is determined. The content is adapted to the destination cartridge, thereby creating consistent file system metadata on the tape of the destination cartridge. The buffered data blocks are written to the tape of the destination cartridge, thereby creating a file system on the tape of the destination cartridge that is a physical copy of both the file system and data contents on the tape of the source cartridge, and a consistent file system on the tape of the destination cartridge.

Another aspect of the invention includes copying data contents of a source data storage tape cartridge to at least one image file. The tape of the source cartridge being formatted by a file system and including at least one metadata block containing data associated with the file system. Data blocks are read from the tape of the source cartridge to a memory buffer, thereby buffering the data blocks. The method determines whether the data blocks read are file system metadata blocks and whether the file system metadata blocks include cartridge-specific and/or cartridge-dependent content. A listing is generated, of all the data blocks read, that includes the data blocks' read size, and identifies file system metadata blocks determined to include the content. The buffered data blocks are written to the image file and the listing is saved the image file.

In yet another aspect of the invention includes copying data contents of a data storage tape cartridge image to a destination data storage tape cartridge. The image being of a source data storage tape cartridge tape formatted by a file system and including at least one metadata block containing data associated with the file system. A listing of data blocks is read from the image. The listing includes the data blocks' read size and identifies file system metadata blocks determined to include cartridge-specific and/or cartridge-dependent content. Data blocks are read from the image to a memory buffer, thereby buffering the data blocks. The content, of data blocks in the list, is adapted to fit a destination data storage tape cartridge, the destination tape being loaded in a tape drive of a host system. The buffered data blocks are written to the tape of the destination cartridge.

Details of the embodiments of the invention are described below in the Detailed Description section in reference to the accompanying drawings. The Brief Summary is intended to provide an overview of the claimed subject matter and is not intended to limit the scope of the claimed subject matter. Other features and advantages of this invention will become apparent from the following Detailed Description.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

Figure 1:
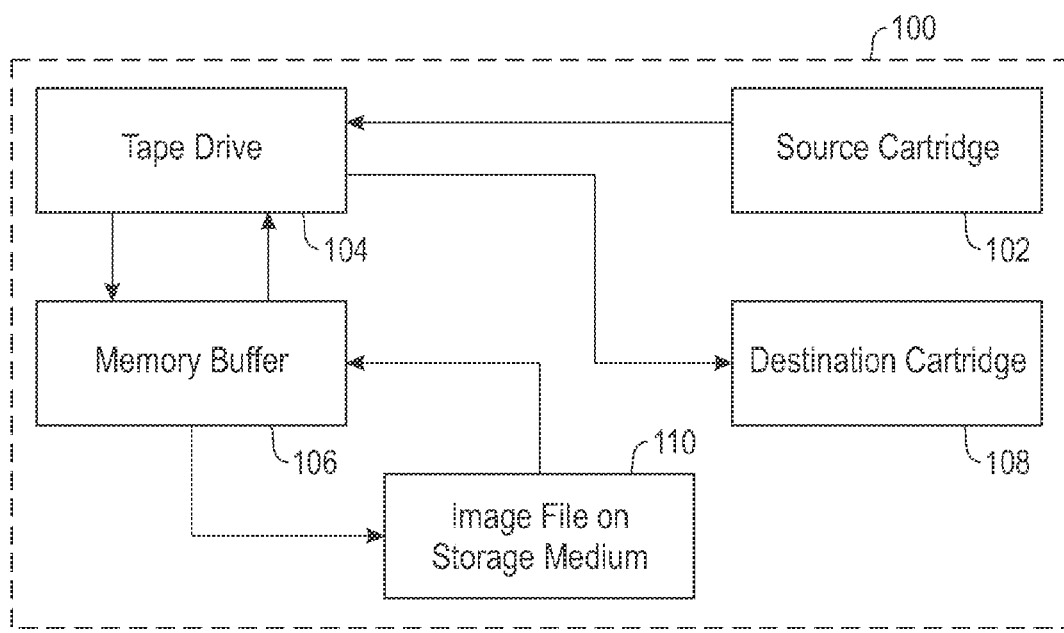
FIG. 1 depicts a flow diagram illustrating a system for copying data contents of a source data storage tape cartridge to a destination data storage tape cartridge and/or to an image file, according to one embodiment.

The following Detailed Description of the embodiments of the system, method, and computer program product of the claimed invention, as presented in the Figures, is not intended to limit the scope of the invention, as claimed, but is merely representative of selected embodiments of the invention. The architecture of the invention, as generally described and illustrated in the Figures herein, may be arranged and designed in a wide variety of different configurations. Thus, the following Detailed Description is intended only by way of example, and simply illustrates certain selected embodiments of systems and processes that are consistent with the invention as claimed herein.

Embodiments of the invention provide a method, system, and computer program product of a tape copy utility for creating an identical copy of a tape cartridge. The tape copy utility may be comprised of in a system, software, or other architectures and provides a novel and efficient way to copy file-system tapes from one cartridge to another while preserving all the data locales, structure and restoration properties, and enables creation of a consistent file system on the destination tape. The utility is also efficient as it reads the content sequentially from tape, for example being independent of file fragmentation and deleted files.

The utility allows a user to create a copy of a tape containing file system structure, directories and files. For example, the copy tape may be used for sharing the content with another user or vendor, for distribution, for backup, as content migration to a new tape cartridge such as when cartridge wears out or its expected life has gone below a certain threshold, or for various other purposes. In another example, the user may want to perform a cross-hardware migration such that the user may want to copy data from one tape hardware platform to another one with incompatible cartridge formats, while preserving the original structure. In addition to backup, a tape copy can be used for archiving purposes. For instance, where a cartridge is put off-site into a vault, not electronically accessible for disaster recovery purposes while still having an online copy for regular operations. Accordingly, the copied tape must be identical to the source tape to enable such use, and tape copy should be replaceable with the original tape.

File-system access to the tape allows use of file copy utilities to copy all the files from the source tape to a new tape; however that approach lacks in several ways. Current utilities do not provide access to previous versions of the tape index, which enable file system rollback of the tape to a previous state or to recover deleted files since file system access can only be used for active files. In addition, current file copy utilities do not preserve the files layout on tape. Certain applications may render files on tape in special ways, such as interleaving extents of multiple files in a specific order for performance and other benefits, which will be lost when copying the files using file system access. Furthermore, current file copy utilities are not able to preserve source location or partition of files. For instance, if certain files are located on the source tape on the index partition, file copy might not be able to direct them to the index partition on the destination tape. Format and mount-time rules may be used for that, however if the source have been created in a different way, there might be no way to create such rules and achieve the desired result.

Moreover, file copy utilities do not preserve off-medium tape-specific metadata such as file system related metadata as part of the cartridge medium auxiliary memory (hereinafter "cartridge memory"). In addition, file system access to files on tape may not access the tape data in the most efficient read order, especially if files are written with multiple extents. Also, when multiple users and applications mount tape as a file system it may be simultaneously accessed, in which such access may interfere with tape copying and might even cause data inconsistencies if the source tape is being changed while copying. Lastly, a naive bit copy of a tape containing a file system may create a tape that is not conforming to the file system format. For example, a Linear Tape File System (LTFS) format tape contains label blocks and index blocks, these label and index blocks may contain information such as the tape volser, tape ID, pointers to logical, physical and LPOS locations on tape. Some or all of this information is cartridge-dependent, and when copied, it no longer matches the destination cartridge and invalidates the format of the tape file system.

Embodiments of the invention provide a solution for tape copying, which makes an identical copy of the source tape files. The utility does not mount the tape as a file system, but rather accesses the tape at the data block level. Data blocks that correspond to the file system are identified and classified from all other blocks, which primarily corresponding to files' content. The file system-specific blocks are then interpreted and modified to match and refer to the destination cartridge. The other data blocks are copied as-is. The tape copy cartridge is consistent with and conforms to the file system format specifications of the original tape cartridge being copied.

The utility may provide further functionality. The utility may compute check-sum and verify the copied content by reading the destination tape and comparing with check-sum or actual content of the source tape. Multi-threading and buffering is used to allow efficient processing and fast copying. The utility may also copy blocks according to their order on tape and preserves the same order on the destination tape, which maximizes tape throughput and reduces tape drive pause and seek. The utility may preserve all the information on the tape, including deleted files and rollback information therefore creating a master copy that is fully interchangeable with the source tape. The utility can also store all blocks in a single image file on disk and use that file later to create additional copies of the imaged tape.

FIG. 1 illustrates a system (100) for copying data contents of a source data storage tape cartridge (102) (hereinafter "source cartridge") to a destination data storage tape cartridge (108) (hereinafter "destination cartridge") and/or to an image file, according to one embodiment. The source tape is previously formatted by a file system and includes at least one metadata block that contains data associated with the file system. In one embodiment, the source and/or destination cartridges include a cartridge memory (e.g., NVM) in addition to tape storage, which is described supra. For example, the source and destination cartridges may include the Linear Tape-Open (LTO) format tape cartridge.

The source cartridge is loaded into the tape drive (104), and read to the memory buffer (106). In one embodiment, the data is written directly from the memory buffer to the destination cartridge (108), which is described supra. In another embodiment of a source cartridge to image copy, the data is written to one or more image files that are stored on the system's permanent storage (110) (e.g., hard disk drive), which is also described supra. In other embodiments, the system may include n (e.g., one or more) number of source drives, memory buffers, and/or destination drives.

Figure 2:
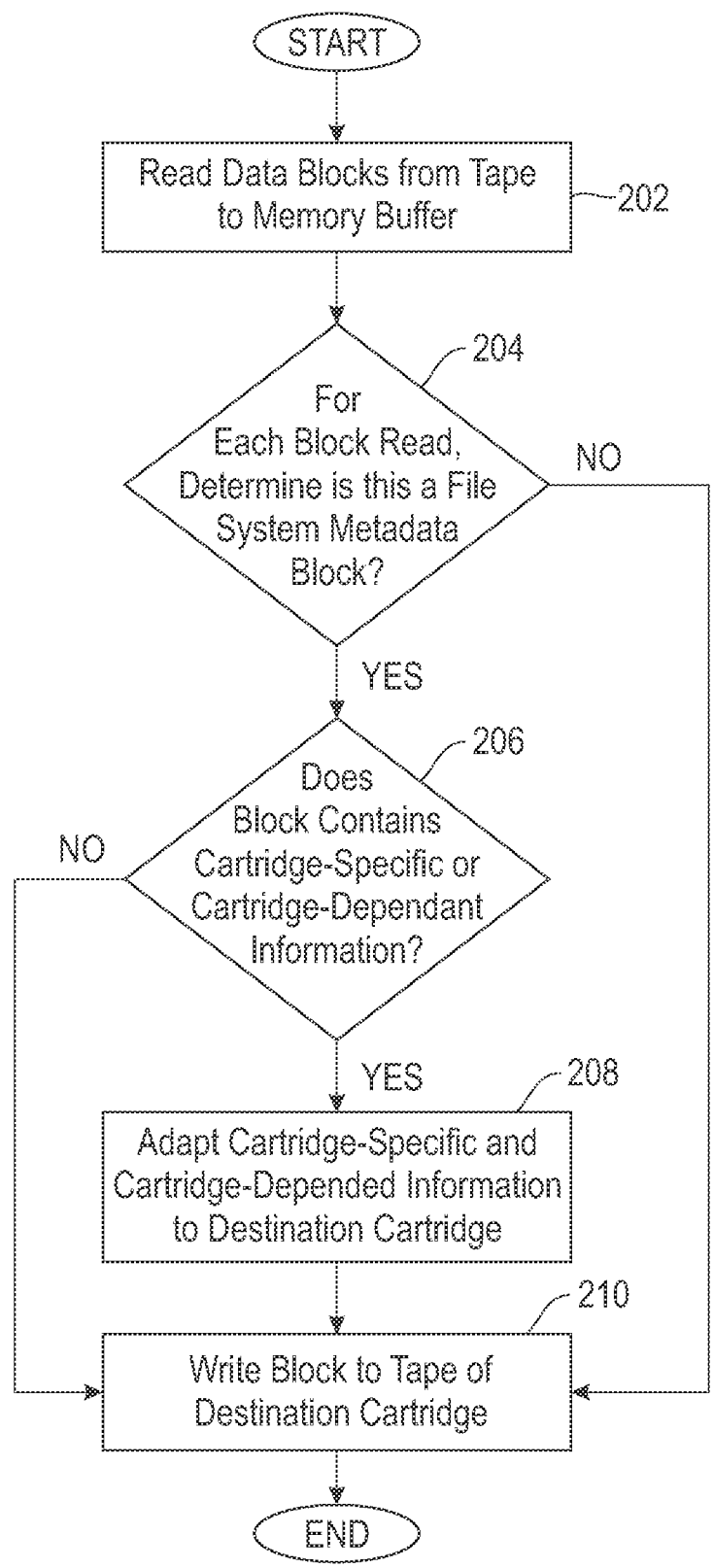
FIG. 2 depicts a flowchart illustrating a process for copying data contents of a source data storage tape cartridge to a destination data storage tape cartridge, according to one embodiment.

Referring now to FIG. 2, the flowchart illustrates the process (200) of copying data contents of a source cartridge to a destination cartridge, according to one embodiment. The tape drive reads data blocks from tape of the source cartridge (hereinafter "source tape") to the memory buffer (202). In one embodiment, the data blocks are read in a sequential order to one or more memory buffers. For each data block read, the system determines if the block is a file system metadata block (204).

In one embodiment, each block read is classified as either a label block, an index block, or other block. Classification may be based in general on the location of the block on tape. For example, label blocks are typically located at the beginning of a tape partition. Classification may further be based on the block size, and on the block content compared to specifications of the tape file system format. In another embodiment, the system may further detect and use file mark delimiters to classify blocks. The system may interpret some of the block's content and test if it follows the format of a label or of an index block.

The system may also read content of a cartridge memory and use it to locate index blocks. The system may further interpret index blocks to extract pointers and indices pointing at other index blocks. In other embodiments, the system may use various combinations of the above methods and other methods to accomplish the classification task. Label blocks, index block, and any other blocks corresponding to the information captured by the file system on tape, are partially interpreted for some or all of their content according to the label and index block specifications.

If a block read is a file system metadata block, the system determines whether the file system metadata blocks include cartridge-specific and/or cartridge-dependent content (206). In one embodiment, the system analyzes the characteristics of the blocks to determine if the blocks include cartridge-specific and/or cartridge dependent content. For example, the characteristics include but are not limited to: location of the read data block on the source tape; source tape file marks; tape LPOS information; part or all of the content of the block; identifiable strings contained in the block including XML field labels; magic numbers; tape cartridge volser; tape cartridge ID; pointers and block numbers found in the content; information found in other blocks which were already determined file system blocks; file system identifiers including version numbers; block size; block statistics of text; characters; and bytes content. Other blocks may include such blocks as file content of both active and deleted files, data blocks created by other applications (which are not part of files), etc. These blocks are to be copied as-is from the source cartridge to the destination cartridge without modification.

If the file system metadata block includes any cartridge-specific and/or cartridge-dependent content, the system adapts the content to the destination cartridge (hereinafter "destination tape") (208). The adapting creates consistent file system metadata on the destination tape. In one embodiment, the system interprets file system-specific blocks and modifies them to match and refer to the target tape.

The buffered data blocks are then written to the destination tape (210). The buffered data blocks are written to the destination tape following a determination that the read data blocks do not include file system metadata blocks (see step 204), if file system metadata blocks do not contain cartridge-specific and/or cartridge-dependent content (see step 206), or following said adapting (see step 208). As a result, the writing creates a file system on the destination tape that is a physical copy of both the file system and data contents on the source tape, and a consistent file system on the destination tape. In another embodiment, the writing replicates information from the source tape to the target tape, including deleted files and rollback information for restoring said deleted files. As a result, the replication thereby creates a master copy of the source cartridge on the destination cartridge that is interchangeable with the source cartridge.

In an embodiment with multiple destination cartridges, the writing may be performed concurrently to n target cartridges. In another embodiment, the data blocks are written to destination tape(s) in the same order as data blocks are written on the source tape.

Figure 3:
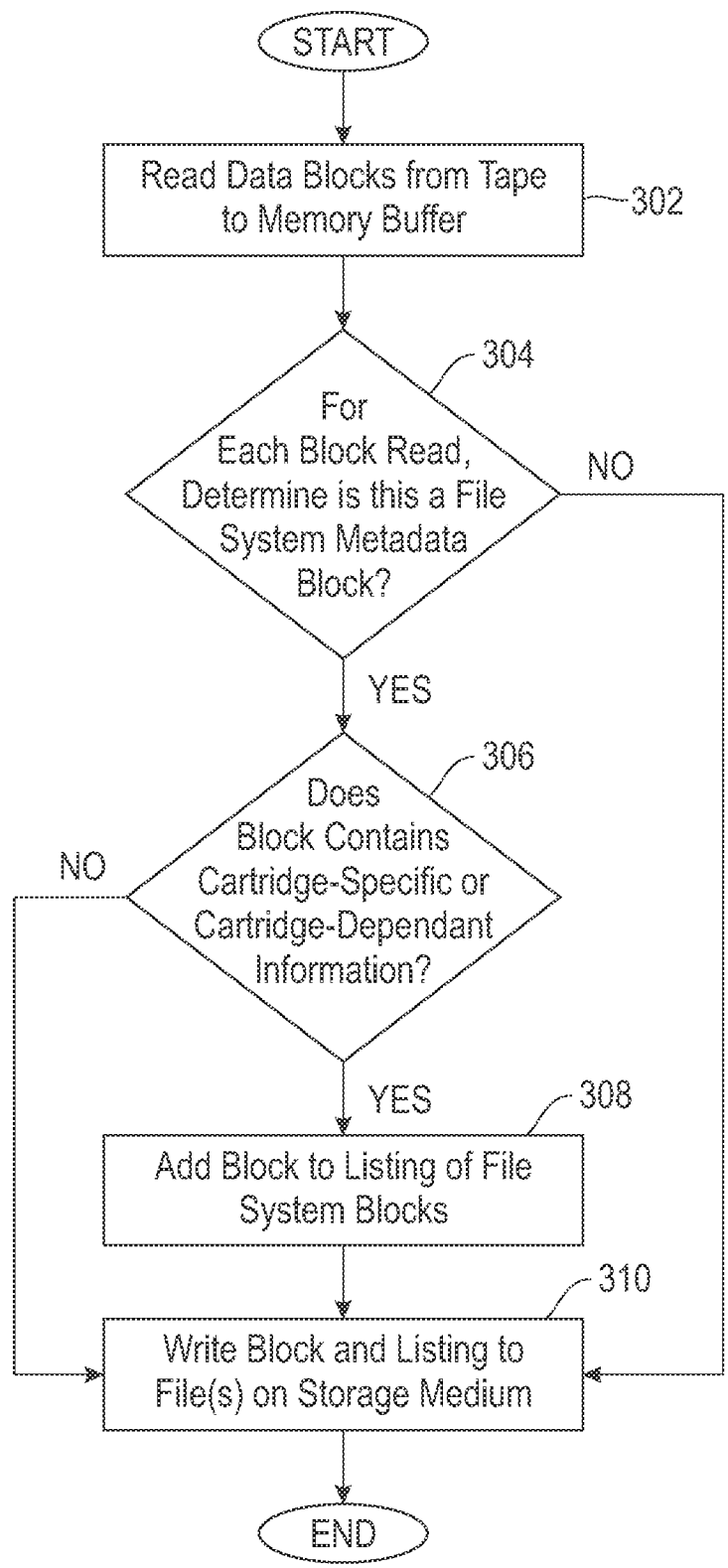
FIG. 3 depicts a flowchart illustrating a process for copying data contents of a source data storage tape cartridge to at least one image file, according to one embodiment.

With reference to FIG. 3, the flowchart illustrates a process (300) for copying data contents of a source cartridge to at least one image file, according to one embodiment. Data blocks are read from the source tape to the memory buffer (302). For each data block read, the system determines whether the block is a file system metadata block (304). If a block read is a file system metadata block, the system then determines whether the file system metadata blocks include cartridge-specific and/or cartridge-dependent content (306). If a file system metadata block contains cartridge-specific and/or cartridge-dependent content, the block is added to a list of file system blocks (308). The list is a generated listing of all the data blocks read, includes the data blocks' read size, and identifies file system metadata blocks determined to include cartridge-specific and/or cartridge-dependent content.

The buffered data blocks and the listing are then written to one or more files that are an image of the source data storage tape cartridge (hereinafter "image file") that is stored on a storage medium (310). The buffered data blocks are written to the destination files following a determination that the read data blocks do not include file system metadata blocks (see step 304), if file system metadata blocks do not contain cartridge-specific and/or cartridge-dependent content (see step 306), or following the blocks being having cartridge-specific and/or cartridge-dependent content being added to the listing (see step 308).

Figure 4:
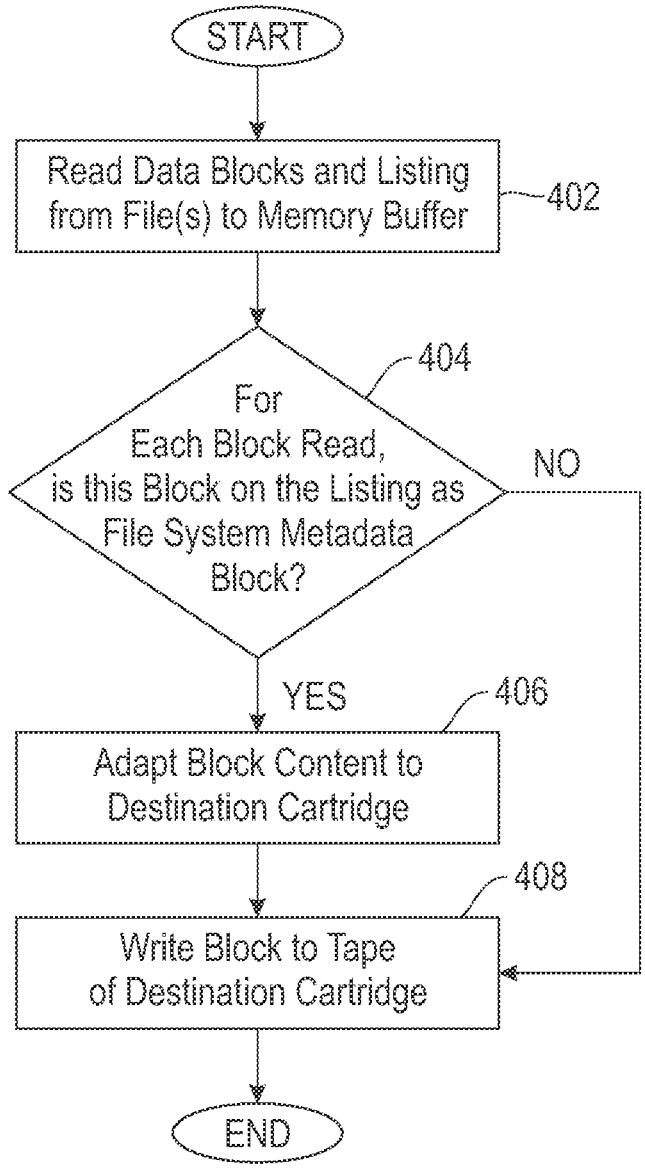
FIG. 4 depicts a flowchart illustrating a first process for copying data contents of a data storage tape cartridge image to a destination data storage tape cartridge, according to one embodiment.

In FIG. 4, the flow chart illustrates a first process (400) of copying data contents of an image, of a data storage tape cartridge, to a destination data storage tape cartridge, according to one embodiment. The image may be comprised of in one or more files (hereinafter "image file(s)") stored on the system's storage. Data blocks and the listing (described infra) are read from the image file(s) (402). For each data block read, it is determined whether the block is listed as a file system metadata block in the listing (404). If a data block read is in the listing to include file system metadata, the content is adapted to the destination tape (406) to create consistent file system metadata on the destination tape. The buffered data blocks are written to the destination tape (408) following a determination that the read data blocks do not include file system metadata blocks (see step 404), or following the adapting (see step 406).

Figure 5:
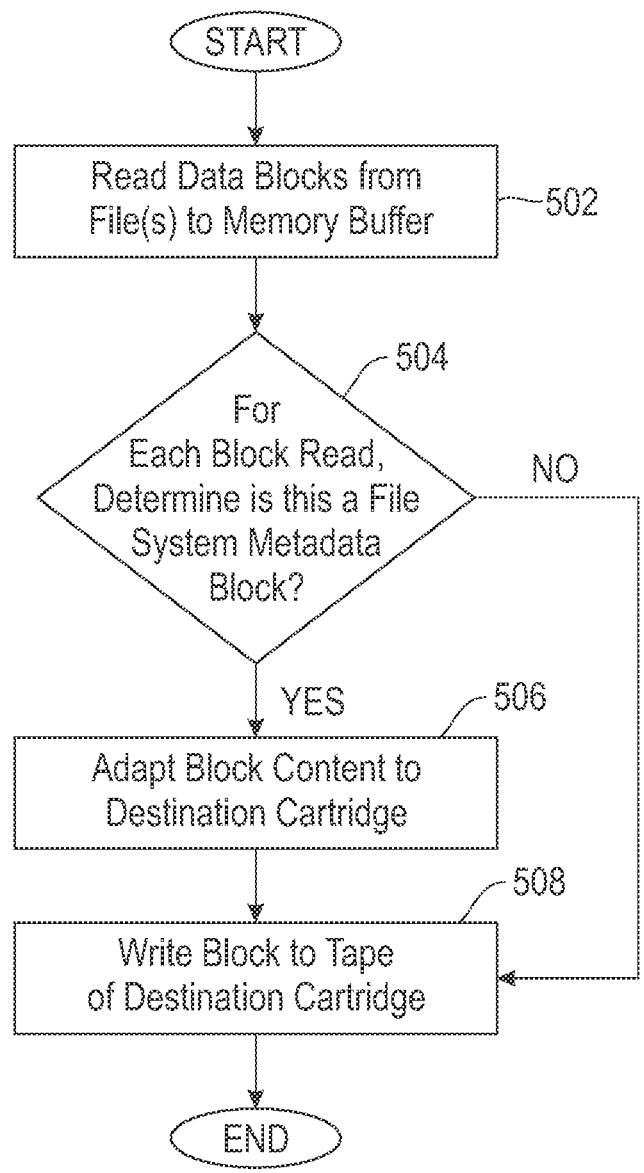
FIG. 5 depicts a flowchart illustrating a second process of copying data contents of a data storage tape cartridge image to a destination data storage tape cartridge, according to another embodiment.

FIG. 5 depicts a flow chart of a second process (500) of copying data contents of an image, of a data storage tape cartridge, to a destination cartridge, according to another embodiment. Data blocks are read from the image file(s) (502). For each data block read, the systems determines, whether the block is a file system metadata block (404). If the data block read includes any file system metadata, the content is adapted to the destination tape (406) to create consistent file system metadata on the destination tape. The buffered data blocks are written to the destination tape (508) following a determination that the read data blocks do not include file system metadata (see step 504), or following the adapting (see step 506).

Figure 6:
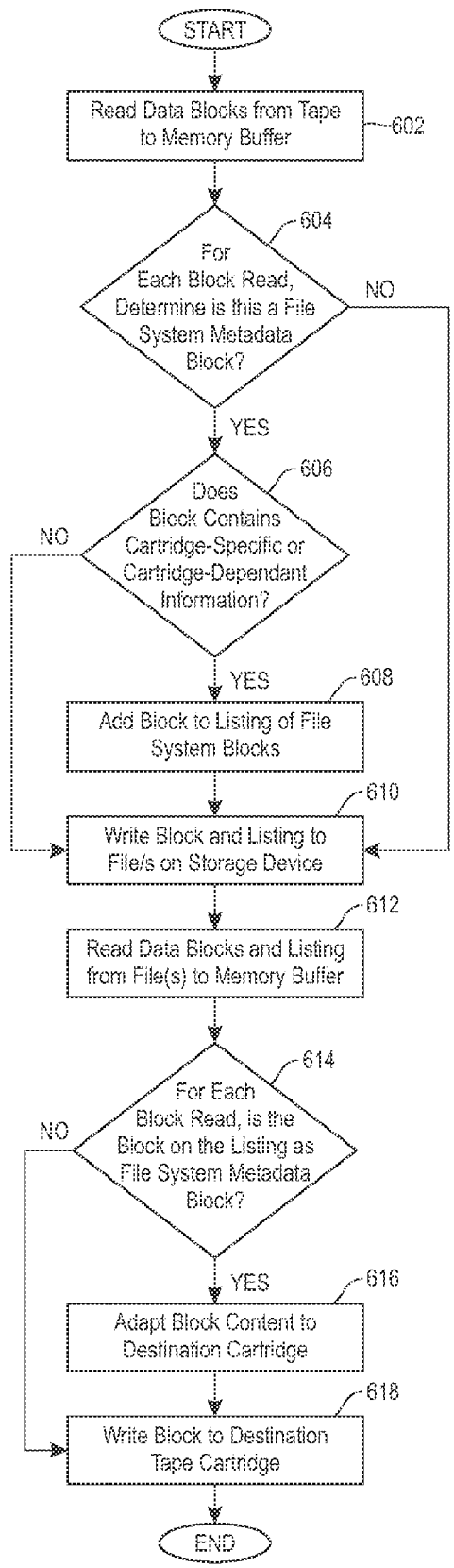
FIG. 6 depicts a flowchart illustrating a process copying data contents of a source data storage tape cartridge to at least one image file and from the at least one image file to a destination storage tape cartridge, according to one embodiment.

Referring to FIG. 6, the flow chart illustrates a process (600) of copying data contents of a source data storage tape cartridge to image file(s) and from the image file(s) to a destination storage tape cartridge, according to one embodiment. Data blocks are read from the source tape to the memory buffer (602). For each data block read, the system determines whether the block is a file system metadata block (604). If a block read is a file system metadata block, the system determines whether the file system metadata blocks include any cartridge-specific and/or cartridge-dependent information (606).

The buffered data blocks and listing are written to an image file (610) following the file system blocks being added to the listing (see step 608), determination that the read data blocks do not include file system metadata blocks (see step 604), or if file system metadata blocks do not contain cartridge-specific and/or cartridge-dependent content (see step 606). The blocks written to the image file are then read from the image file(s) to the memory buffer (612). For each block read, the system then determines whether the block is a file system metadata block (614). If a data block read is in the listing to include file system metadata, the content is adapted to the destination tape (616) to create consistent file system metadata on the destination tape. The data blocks read are written to the destination tape (618), following the adaption (see step 616) or if a block read is not listed as a file system metadata block (see step 614).

This embodiment may work with a system using a single tape drive. With a single tape drive, the source tape cartridge is loaded to the tape drive, blocks are read, and the image file(s) are created according to the above. Then, the source tape cartridge is ejected from the drive and the target tape cartridge is loaded into the drive. Next, blocks are read from the image file(s) and written to target tape cartridge while file system blocks are adapted to the target cartridge.

Figure 7:
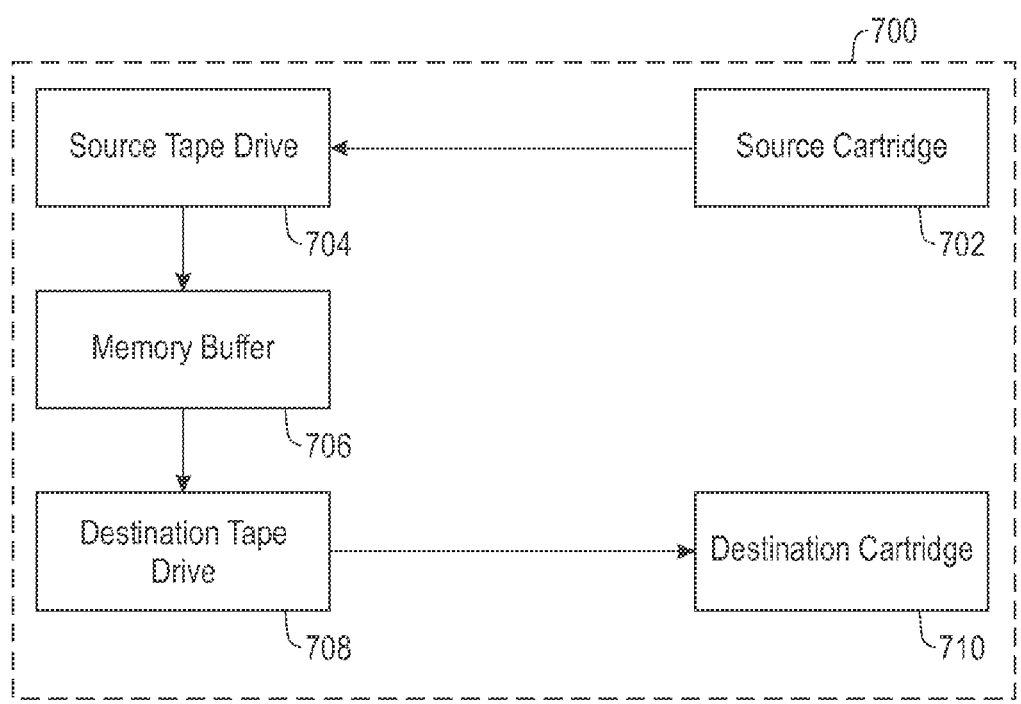
FIG. 7 depicts a flow diagram illustrating a system, with dual tape drives, for copying data contents of a source data storage tape cartridge to a destination data storage tape cartridge, according to one embodiment.

With reference to FIG. 7, the system (700) has dual tape drives for copying data contents of a source cartridge (702) to a destination cartridge (710), according to one embodiment. According to this embodiment, the system having two tape drives allows the system to perform the copying without the need for a user to manually unload the source tape cartridge for loading the destination cartridge. Data is read from the source cartridge loaded in the source tape drive (704) to the system's memory buffer (706). Data is then read from the memory buffer by the destination tape drive (708), and then written to the destination cartridge (710). This method is implemented in accordance with embodiments described infra. In other embodiments, the system may include n of number of source drives, memory buffers, and/or destination drives.

Figure 8:
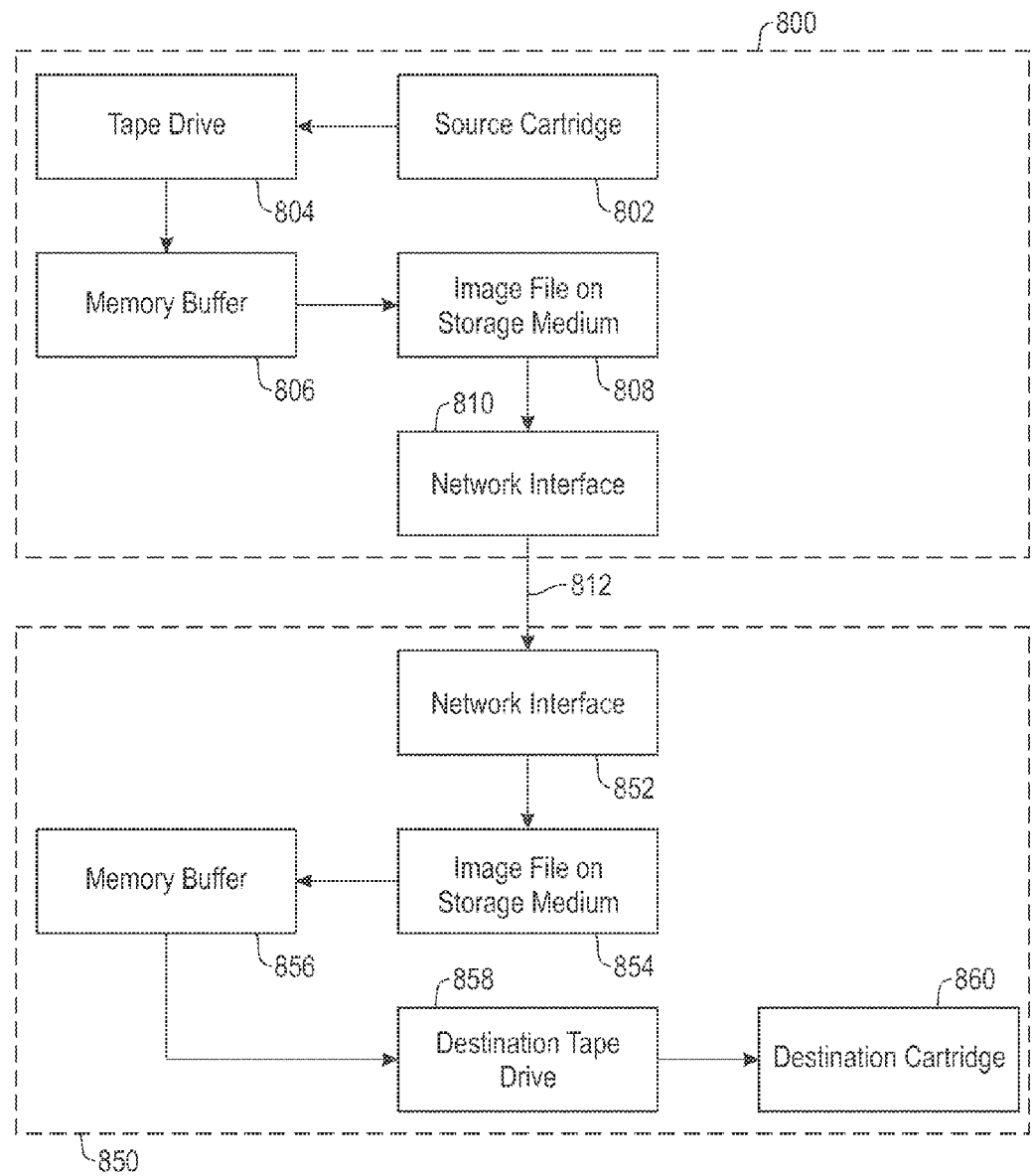
FIG. 8 depicts a flow diagram illustrating a system for copying data contents of a source data storage tape cartridge to a destination data storage tape cartridge over a network and using an image file, according to one embodiment.

Referring to FIG. 8, the system (800) copies data contents of a source cartridge (802) to a destination cartridge (860) over a network (812), and using an image file(s), according to one embodiment. The first host system (hereinafter "source system") and the second host system (hereinafter "destination system") are in communication over the network. Data from the source cartridge is read by the tape drive (804) of the source system, and then to the memory buffer (806). The buffered data blocks are then written to image file(s) being stored on the source system's storage (808). The source system further includes a network interface (810) for network communications. In other embodiments, the system may include n number of source drives, memory buffers, and/or destination drives.

The destination system also includes a network interface (852), which interfaces to receive data from source system. The received data is then written to image file(s) on the destination system's storage (854). The data is then read from the image file(s) to the destination system's memory buffer (856), and then the buffered blocks is received by the destination drive (858) and written to the destination cartridge (860).

Figure 9:
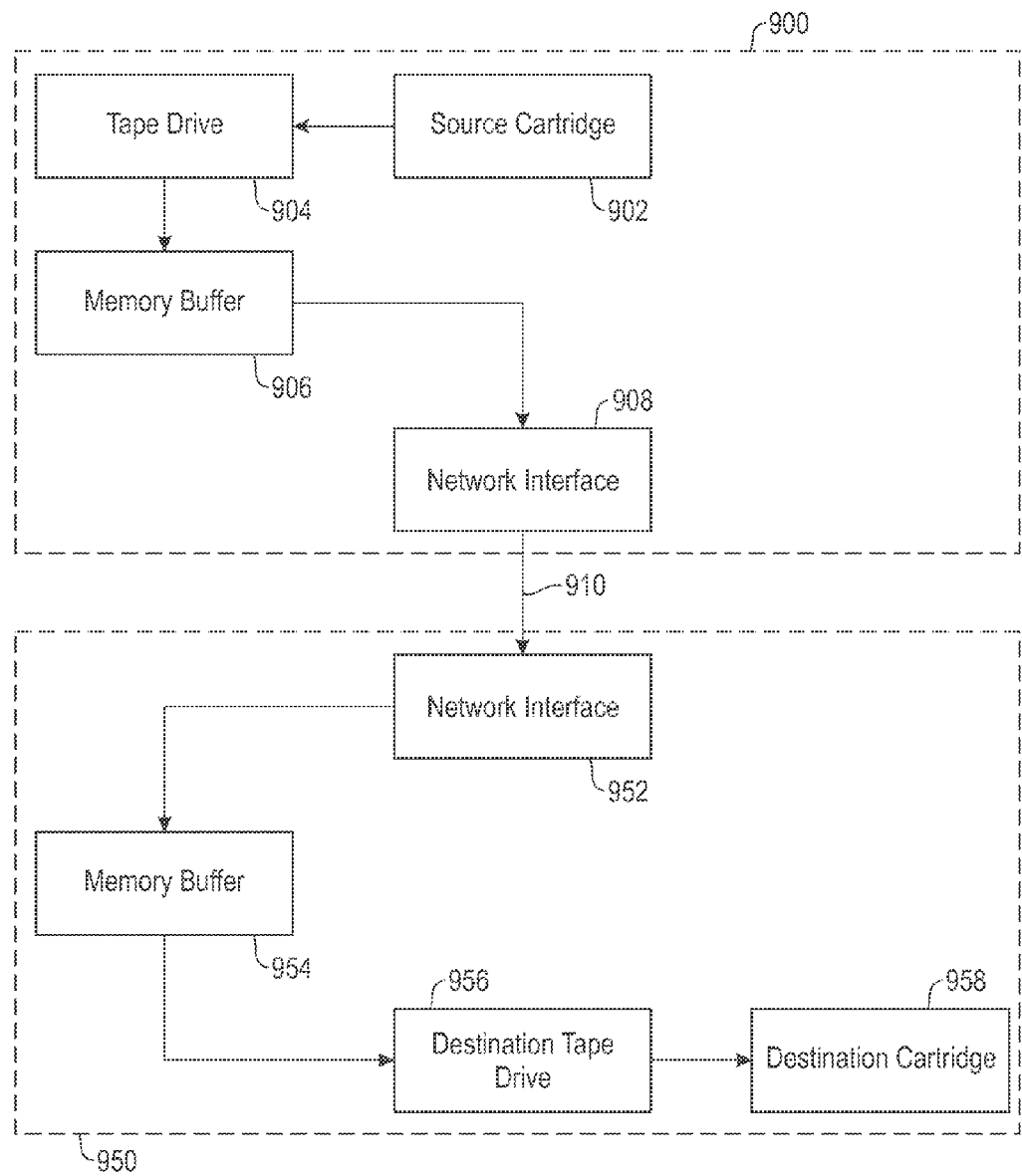
FIG. 9 depicts a flow diagram illustrating a system for copying data contents of a source data storage tape cartridge to a destination data storage tape cartridge over a network, according to one embodiment.

In FIG. 9, the system copies data contents of a source cartridge (902) to a destination cartridge (958) over a network (910), according to an embodiment where data is not first written to either system's storage. The source system (900) and the destination system (950) are in communication over the network. Data from the source cartridge are read by the tape drive (904) of the source system, and then to the memory buffer (906). In other embodiments, the source and destination systems may include n number of drives. The source system further includes a network interface (908) for network communications for receiving and transmitting data over the network. The destination system also includes a network interface (952), which interfaces to receive and send data over the network. The data received is then buffered by the memory buffer (954) and written to the destination cartridge (958) being loaded into destination tape drive (956).

The systems illustrated in FIG. 1 and FIG. 7-FIG. 9, where the source and destination systems may include n number of drives, the utility is multi-threaded and copies content from the source drive, multiple drives, or source files to one or more buffers. For example, the threads read the content simultaneously from the source memory buffer to write to the n destination cartridges using the n tape drives. Parallel threads within the tape copy system can be used to copy the data from a memory buffer to the n destination cartridges simultaneously using the n tape drives.

In each of the foregoing embodiments (as shown in FIG. 1-FIG. 9), the source and destination cartridges may contain an additional memory module comprising NVM, such as a FLASH memory. For example, the NVM may store index files, file system metadata, and other content. In one embodiment, the system would copy this content of the NVM from the source tape to the target tape. In another embodiment, if only the source or the target cartridges contain NVM, or if the size or format of the NVM in the source cartridge is not conforming the size or format of the NVM in the second cartridge, the system may still copy the tape content. The system may further copy content from the cartridge memory content source tape to the cartridge memory of the destination cartridge.

In one embodiment, the cartridge memory is formatted by a file system suitable for NVM, such as FAT-16, FAT-32, or other file system format. Content is stored in the NVM as files, organized in directories. This content may be copied to the NVM. When copying from drive-to-drive (see FIG. 1), the files from the NVM on the source cartridge are copied to the NVM on the target cartridge. Furthermore, some files may contain tape's file system specific information, such as an XML file containing the LTFS file-index of the tape content. Such files may be classified from other files by their names, directory location, content, and by comparing their content to index blocks found on the tape itself, or a combination of such methods. Once such file is identified, it may be partially or fully parsed, and any information related to the cartridge (such as cartridge ID, volser, etc.) be identified and modified with those of the destination cartridge before it is written to the NVM of the destination cartridge.

In another embodiment, when copying from drive-to-drive over a network (see FIG. 8 and FIG. 9), the same process is applied however after reading the NVM of the source cartridge and before writing it to the target cartridge, the content is transferred over the network.

In another embodiment, when copying from a source cartridge to an image file on another file system (see FIG. 1), the NVM content is read and is combined into one NVM container file. The NVM container file may be incorporated into the tape image file, or be kept as a separate file. The NVM container file can be created using a TAR utility (Tape Archive Format), a data compression utility (such as zip) or in any other suitable method. Further metadata of the NVM files may be saved within or alongside the NVM container file, including ownership, creation and modification dates, READ-ONLY and other flags, Extended Attributes and so on. Some or all of these and other properties and metadata may be preserved by the NVM container or compressing method used, or kept separately within the tape image file, or in a separate file.

The NVM container file is opened and the files are copied to the target NVM, when using the tape copy utility of this invention to copy from the tape image file to a target cartridge. The associated saved metadata is then written by the tape copy utility to the target NVM. Some operating systems and file systems may require the tape copy utility to be invoked with administrator or root privileges and/or other security and write access permissions to accomplish the writing and modification of file properties on the target NVM. These can be accomplished using best practices as known to those skilled in the art.

In another embodiment, the NVM files are first copied to the NVM of the destination tape without classification and modification of cartridge-specific information. A second process is then invoked to access the NVM content on the destination tape, check its consistency, against the tape content, the cartridge information and the file system on tape, and correct all the ID-s, indices and other information on the NVM to make the NVM content consistent. This embodiment makes use of the fact that the NVM, in general, provides random access to its content and allows modifying the content in place (as opposed to the content written to tape which is written sequentially and cannot be modified in place). For example, this process has a potential advantage in separating the NVM content classification and modification from the tape copy utility, which may be performed in a more general-purpose way, such as by using an off-the-shelf file copy and compression utility, like zip.

In another embodiment, the content of the NVM may be written in other ways, without using a file system on the NVM. In such cases the system of the subject invention would use the particular NVM access and format to read, interpret and write the content to file and or to a target tape.

In yet another embodiment comprising NVM, the system reads file system content from cartridge memory of the source cartridge to the memory buffer. The file system content being adapted from the memory module to a memory module of destination cartridge thereby resulting in file system metadata on the memory module of said target cartridge is consistent. The file system content is then written to the memory module of the target cartridge.

In each of the foregoing embodiments (as shown in FIG. 1-FIG. 9), decryption and re-encryption of blocks may be required according to different keys associated with the different cartridges. This may be achieved by the tape drive, or by the system comprising the copy utility, depending on the system architecture, encryption being used, and key management etc. For example, when the encryption is performed within the drive, an encryption key should be provided to be able to read the content off the source tape. The content read is already decrypted, as the decryption is handled in the tape drive itself. Similarly, for writing an encrypted tape using the drive encryption, a key should be provided to the writing drive, which then encrypts all the data it receives for writing. Encryption of the image file can be implemented using various file encryption techniques and off-the-shelf tools.

Similar to data encryption, data compression may be performed on the tape content. Data compression may be handled within the tape drive or by software running alongside with the copy utility. When handled by the tape drive, the data is sent to the drive uncompressed. The drive compresses the data before writing to tape, and automatically decompresses it when reading from the tape. In such a case the system does not require any modifications, except setting the drive compression mode to the desired mode (e.g., on/off). In other embodiments, data compression of the image file can be achieved by using available compression software and APIs.

A tape image file may contain an uncompressed/unencrypted header, which provides information about the compression and/or encryption applied to the file, as well as other identification and metadata information such as volser and cartridge ID of the source cartridge. The information contained in this header should be sufficient to allow the copy utility to apply the appropriate decryption and decompression processes to open and use the image file. When both encryption and compression are used, compression is in general more efficient when applied before encryption. Encryption and compression may also apply to the content of the NVM.

In some embodiments, a cartridge that was uncompressed (and/or unencrypted) can be copied to a compressed (and/or encrypted) cartridge, and vice versa. This may be achieved by setting the encryption and compression of the target drive accordingly. For example, this is useful for copying from an uncompressed/unencrypted cartridge to compressed/encrypted cartridge. As a result, extra space is saved on the target cartridge. In another example, when migrating data from cartridges of one type to cartridges of another type, where available compression and encryption methods may be different. In certain situations, such as copying from a compressed cartridge to a uncompressed cartridge, the size of the uncompressed data might be larger than the capacity of the target cartridge. In such cases the tape copy would fail, and it may produce an appropriate error message.

While compression, encryption and decryption methods are not the subject matter of this invention it should be clear to a person skilled in the art that such data encryption and decryption methods have to be properly applied and managed when copying encrypted content from one cartridge to another, using the standard tools, methods and APIs provided to support encryption on file systems in general and tapes in particular.

In each of the foregoing embodiments (as shown in FIG. 1-FIG. 8), a check-sum is computed for data blocks on the source and destination tapes, which are compared for verifying that content of data blocks on the source tape is identical with content of corresponding data blocks on the destination tape. For example, parity bit, error correction code, or hash function. Check-sum may be computed for blocks read from the source tape. Check-sum may also be kept in memory, may be stored alongside blocks in an image file of the tape, or as a table in a separate file on hard drive, or as a table in a NVM in cartridge, when available. Check-sum may then be computed for plurality of blocks read from the destination tape. The check-sum computed for a block read from the source tape may be compared with the check-sum computed for the same block as read from the destination tape. In one embodiment, the adapted content is excluded from the comparison.

If the two check-sum values were different, it would indicate a mismatch between the content of the source block and its copy, or a copy error. Copy errors may be counted, listed, logged, saved, and reported to user in various ways. A copy error indication may also be used to invoke a corrective operation, such as a second attempt to read and write a block or a plurality of blocks or whole sections of the tape, to mark some parts of the target tape as bad, or to abort the copy operation. In one embodiment, the mismatch is reported by the system to a user. In other embodiments, additional error-handling operations may be performed, which may include retrying to copy the blocks, retry copying the entire tape, or fail the copy operation and eject the tape.

A check-sum is one way to detect copy errors. In other embodiments, other ways to detect copy errors include direct comparison of block content between the source and the target, statistical comparison of partial information, etc. Many such methods as known by those skilled in the art may be used by the utility to detect tape copy errors. Label and index blocks are carefully compared while avoiding or ignoring those parts of the block which were modified by system to adopt the content of these blocks to conform and match with the new cartridge. Checks-sum may be computed on buffered content while in memory, without affecting read (which fills up a second buffer) nor write (which write the content of a third buffer). In another embodiment, the check-sum is computed on multiple buffers simultaneously by multiple threads for the forgoing system embodiments with n number of source drives, memory buffers, and/or destination drives. Buffers may also be recycled after they finish serving their current task.

In each of the foregoing embodiments (as shown in FIG. 1-FIG. 9), buffering of content read from the source tape before it is written to the target tape has multiple advantages. One performance advantage which may be achieved by buffering is multi-threaded or otherwise parallel reading of content from the source tape while writing previously read content to the target tape thereby performing the read and write operations simultaneously. Another performance advantage of buffering is to maintain consistent streaming bandwidth on both source and target tapes, possibly at different rates, for extended periods of time. Such consistent streaming periods prevent or reduce the number of tape pauses and therefore increase throughput, reduce tape and drive wear, and reduce overall copying time. In some embodiments, buffering may utilize available room in main memory, available space on hard drive, SSD, and other storage devices and medium. Buffer size and the number of buffers may vary.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "manager," or "system." Furthermore, aspects of the present invention may take the form of a computer program product embodied in one or more computer readable medium(s) having computer readable program code embodied thereon.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
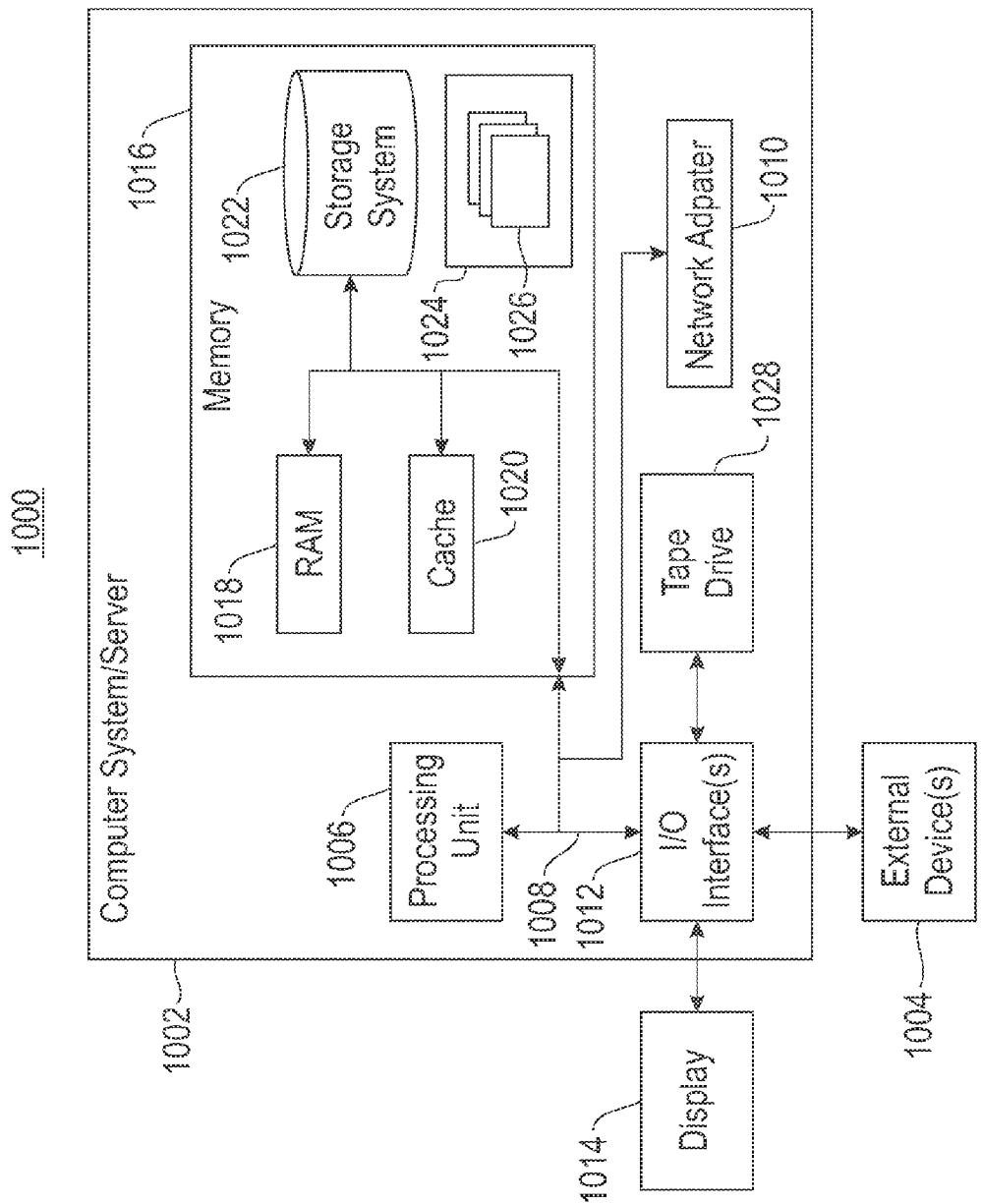
FIG. 10 depicts a block diagram illustrating an exemplary general-purpose computing architecture for implementing embodiments of the present invention.

FIG. 10 depicts a block diagram illustrating an exemplary general-purpose computing architecture (1000) for implementing embodiments of the present invention. The architecture includes a computer system/server (1002) (hereinafter "system"). The components of the system may include, but are not limited to, one or more processors or processing units (1006), a system memory device (1016), a tape drive (1028) and a bus (1008) that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system typically includes a variety of computer system readable media. Such media may be any available media that is accessible by the system, and it includes both volatile and non-volatile media, removable and non-removable media. The system memory can include computer system readable media in the form of volatile memory, such as random access memory (RAM) (1018) and/or cache memory (1020).

The system may further include other removable/non-removable, volatile/non-volatile computer system storage media. By way of example only, storage system (1022) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, the memory device may include at least one program product having a set (e.g., at least one) of program modules that are configured to carry out the functions of embodiments of the invention.

The program/utility (1024), having a set (at least one) of program modules (1026), may be stored in the system memory by way of example, and not limitation, as well as an operating system, one or more application programs, other program modules, and program data. Each of the operating systems, one or more application programs, other program modules, and program data or some combination thereof, may include an implementation of a networking environment. The program modules generally carry out the functions and/or methodologies of embodiments of the invention as described herein.

The system may also communicate with one or more external devices (1004), such as a keyboard, a pointing device, a display (1014), etc.; one or more devices that enable a user to interact with the system and/or any devices (e.g., network card, modem, etc.) that enable the system to communicate with one or more other computing devices. Such communication can occur via Input/Output (I/O) interfaces (1012). Still yet, the system can communicate with one or more networks such as a local area network (LAN), a general wide area network (WAN), and/or a public network (e.g., the Internet) via network adapter (1010). As depicted, network adapter (1020) communicates with the other components of the system via the bus. It should be understood that although not shown, other hardware and/or software components could be used in conjunction with the system. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that, although specific embodiments of the invention have been described herein for purposes of illustration, various modifications may be made without departing from the spirit and scope of the invention. In particular, the system can be configured to support creation of consistency point associated with a virtual machine. Accordingly, the scope of protection of this invention is limited only by the following claims and their equivalents.

What we claim is:

1. A method of copying data contents of a source data storage tape cartridge to a destination data storage tape cartridge, the tape of said source cartridge being formatted by a file system and including at least one metadata block containing data associated with the file system, the method comprising:
   reading data blocks from the tape of said source cartridge to a memory buffer, thereby buffering said data blocks;
   determining whether the data blocks read are file system metadata blocks;
   determining whether the file system metadata blocks include cartridge-specific and/or cartridge-dependent content;

adapting said content to the destination cartridge, thereby creating consistent file system metadata on the tape of said destination cartridge; and writing the buffered data blocks to the tape of said destination cartridge.

2. The method of claim 1, wherein said writing creates: a file system on the tape of said destination cartridge that is a physical copy of both the file system and data contents on the tape of said source cartridge, and a consistent file system on the tape of said destination cartridge.

3. The method of claim 1, wherein said source cartridge is loaded to a drive of a first host system, and said destination cartridge is loaded to a drive of a second host system, the first host system and second host system being in communication over a network.

4. The method of claim 1, wherein said writing is performed concurrently to a plurality of destination cartridges.

5. The method of claim 1, wherein said writing includes writing data blocks to the tape of said destination cartridge in the same order as data blocks are written on the tape of said source cartridge.

6. The method of claim 1, further comprising:
reading file system content from a memory module of said source cartridge to the memory buffer;
adapting the file system content from said memory module to a memory module of said destination cartridge such that file system metadata on the memory module of said destination cartridge is consistent; and
writing the file system content read to the memory module of said destination cartridge.

7. The method of the claim 1, further comprising:
verifying that content of data blocks on the tape of said destination cartridge is identical with content of corresponding data blocks on the tape of said source cartridge, by comparing content of data blocks on the tape of said destination cartridge with content on the tape of said source cartridge, said adapted content being excluded from the comparison.

8. The method of claim 7, further comprising:
reporting any data block mismatches based on the comparison.

9. The method of claim 7, wherein said verifying includes:
computing a first check-sum for data blocks read from the tape of said source cartridge;
computing a second check-sum for data blocks read from the tape of said destination cartridge;
comparing the first check-sum with the second check-sum; and
if the first check-sum and second check-sum are not identical, reporting a check-sum error.

10. The method of claim 1, wherein said adapting includes: interpreting file system-specific blocks, and modifying the file system-specific data blocks to match and refer to said destination tape.

11. The method of claim 1, wherein said writing replicates information from the tape of said source cartridge to the tape of said destination cartridge, said information including deleted files and rollback information for restoring said deleted files, the replicating thereby creating a master copy of said source cartridge that is interchangeable with said source cartridge.

12. A computer program product of copying data contents of a source data storage tape cartridge to a destination data storage tape cartridge, the tape of said source cartridge being formatted by a file system and including at least one metadata block containing data associated with the file system, the computer program product comprising a non-transitory computer readable storage medium having program code embodied therewith, the program code being readable and executable by a computer to:
read data blocks from the tape of said source cartridge to a memory buffer, thereby buffering said data blocks;
determine whether the data blocks read are file system metadata blocks;
determine whether the file system metadata blocks include cartridge-specific and/or cartridge-dependent content;
adapt said content to the destination cartridge, thereby creating consistent file system metadata on the tape of said destination cartridge; and
write the buffered data blocks to the tape of said destination cartridge.

13. A system of copying data contents of a source data storage tape cartridge to a destination data storage tape cartridge, the tape of said source cartridge being formatted by a file system and including at least one metadata block containing data associated with the file system, the system comprising:
at least one tape drive that loads said source cartridge and reads data blocks from the tape of said source cartridge;
a memory buffer that buffers data blocks read from the tape of said source cartridge; and
a processor executing a program that: determines whether the data blocks read are file system metadata blocks, determines whether the file system metadata blocks include cartridge-specific and/or cartridge-dependent content, and adapts said content to the tape of said destination cartridge, creates a consistent file system on the tape of said destination cartridge, wherein said at least one tape drive further writes the buffered data blocks to said destination cartridge.

14. A method of copying data contents of a source data storage tape cartridge to at least one image file, the tape of said source cartridge being formatted by a file system and including at least one metadata block containing data associated with the file system, the method comprising:
reading data blocks from the tape of said source cartridge to a memory buffer, thereby buffering said data blocks, thereby buffering said data blocks;
determining whether the data blocks read are file system metadata blocks;
determining whether the file system metadata blocks include cartridge-specific and/or cartridge-dependent content;
generating a listing, of all the data blocks read, that: includes the data blocks' read size, and identifies file system metadata blocks determined to include said content;
writing the buffered data blocks to said image file; and
saving said listing with said image file.

15. The method of claim 14, wherein said source cartridge is loaded to a drive of a first host system and said one or more files are stored by a second host system, the first and second host systems being in communication over a network.

16. The method of claim 15, further comprising:
reading said listing from said one or more files;
reading the written data blocks from said one or more files to a memory buffer;
adapting said content to the tape of a destination data tape cartridge, creating a consistent file system metadata on the tape of said destination cartridge, said destination tape being loaded in a tape drive; and
writing the buffered data blocks to the tape of said destination cartridge.

17. The method of claim 16, wherein said writing creates: a file system on the tape of said destination cartridge that is a physical copy of both the file system and data contents on the tape of said source cartridge, and a consistent file system on the tape of said destination cartridge.

18. The method of claim 17, wherein the identified file system metadata blocks determined to include said content and said listing are written to a first file among said at least one image file, and the data blocks read that were not were not determined and identified to include said content are written to a second file among said at least one image file, said first and second files comprising said at least one image file.

19. The method of the claim 15, further comprising:
verifying that content of data blocks on the said image file is identical with content of corresponding data blocks on the tape of said source cartridge, by comparing content of data blocks on said image file with content on the tape of said source cartridge, said adapted content being excluded from the comparison.

20. The method of claim 19, wherein said verifying includes:
computing a first check-sum for data blocks read from the tape of said source cartridge;
computing a second check-sum for data blocks read from said image file;
comparing the first check-sum with the second check-sum; and
if the first check-sum and second check-sum are not identical, reporting a check-sum error.

21. The method of claim 14, further comprising:
transferring said image file from a first data storage system, storing said image file, to a second data storage system, the first and second storage systems being in communication over a network.

22. The method of claim 14, wherein said adapting includes: interpreting file system-specific blocks, and modifying the file system-specific data blocks to match and refer to said image file.

23. The method of claim 14, wherein said writing replicates information from the tape of said source cartridge to said image file, said information including deleted files and rollback information for restoring said deleted files, the replicating thereby creating a master copy of said source cartridge that is interchange-able with said source cartridge.

24. A computer program product of copying data contents of a source data storage tape cartridge to at least one image file, the tape of said source cartridge being formatted by a file system and including at least one metadata block containing data associated with the file system, the computer program product comprising a non-transitory computer readable storage medium having program code embodied therewith, the program code being readable and executable by a computer to:
reading data blocks from the tape of said source cartridge to a memory buffer, thereby buffering said data blocks;
determining whether the data blocks read are file system metadata blocks;
determining whether the file system metadata blocks include cartridge-specific and/or cartridge-dependent content;
generating a listing, of all the data blocks read, that: includes the data blocks' read size, and identifies file system metadata blocks determined to include said content;
writing the buffered data blocks to said image file; and
saving said listing with said image file.

25. A method of copying data contents of a data storage tape cartridge image to a destination data storage tape cartridge, said image being of a source data storage tape cartridge tape formatted by a file system and including at least one metadata block containing data associated with the file system, the method comprising:
reading a listing of data blocks from said image, the listing includes: the data blocks' read size and identifies file system metadata blocks determined to include cartridge-specific and/or cartridge-dependent content;
reading data blocks from said image to a memory buffer;
adapting said content, of data blocks in the list, to fit a destination data storage tape cartridge, said destination tape being loaded in a tape drive of a host system; and
writing the buffered data blocks to the tape of said destination cartridge.

26. The method of claim 25, wherein said writing creates: a file system on the tape of said destination cartridge that is a copy of the file system and data contents of said image, and a consistent file system metadata on the tape of said destination.

* * * * *